US011104045B1

United States Patent
Guo et al.

(10) Patent No.: US 11,104,045 B1
(45) Date of Patent: Aug. 31, 2021

(54) DEVICE FOR PREPARING THERMALLY CONDUCTIVE SHEET WITH GRAPHENE FIBERS IN AN ORIENTED ARRANGEMENT

(71) Applicants: Suzhou Kanronics Electronic Technology CO., LTD., Suzhou (CN); Shenzhen HanHua™ Technology Co., LTD., Shenzhen (CN)

(72) Inventors: Mars Guo, Nanyang (CN); Daniel Huang, Shenzhen (CN); Wenbin Chen, Nanxiong (CN); William Yang, Heze (CN)

(73) Assignees: SUZHOU KANRONICS ELECTRONIC TECHNOLOGY CO., LTD., Suzhou (CN); SHENZHEN HANHUA TM TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/053,077

(22) PCT Filed: Mar. 10, 2020

(86) PCT No.: PCT/CN2020/078635
§ 371 (c)(1),
(2) Date: Nov. 5, 2020

(87) PCT Pub. No.: WO2021/098086
PCT Pub. Date: May 27, 2021

(30) Foreign Application Priority Data

Nov. 18, 2019 (CN) .......................... 201911130092.4

(51) Int. Cl.
*B29C 43/04* (2006.01)
*B29C 43/00* (2006.01)
(Continued)

(52) U.S. Cl.
CPC ............ *B29C 43/003* (2013.01); *B29C 43/04* (2013.01); *B29C 2043/3283* (2013.01);
(Continued)

(58) Field of Classification Search
CPC ................. B29C 43/003; B29C 43/04; B29C 2043/3283; B29C 2793/009;
(Continued)

(56) References Cited

U.S. PATENT DOCUMENTS

| 5,002,715 | A | * | 3/1991 | Grapes | .................... | B29C 43/18 |
| | | | | | | 264/162 |
| 8,132,835 | B2 | * | 3/2012 | Ban | ...................... | B25J 15/0616 |
| | | | | | | 294/2 |

(Continued)

FOREIGN PATENT DOCUMENTS

| CN | 103117397 A | 5/2013 |
| CN | 103922311 A | 7/2014 |

(Continued)

*Primary Examiner* — Matthew J Daniels
*Assistant Examiner* — Shibin Liang
(74) *Attorney, Agent, or Firm* — Bayramoglu Law Offices LLC (57) ABSTRACT

A device for preparing a thermally conductive sheet with graphene fibers in an oriented arrangement includes a first mold and a second mold. The first mold is configured to press a first cuboid block, and the second mold is configured to repeatedly press the first cuboid block. The first mold is provided with a first mold groove. A first mold cover covers an opening end of the first mold groove, and the first mold cover and the first mold are configured to press the first cuboid block. A second mold groove is arranged on one side of the second mold, and a second mold cover is arranged at an opening end of the second mold groove. A movable thickness limiting block is arranged at a side of the second (Continued)

mold cover adjacent to the second mold groove, and is configured to be clamped in the second mold groove.

8 Claims, 6 Drawing Sheets

(51) Int. Cl.
  *B29C 43/32* (2006.01)
  *B29K 307/04* (2006.01)
  *B29K 105/12* (2006.01)
  *B29K 105/00* (2006.01)
  *B29K 505/02* (2006.01)

(52) U.S. Cl.
  CPC .. *B29C 2793/009* (2013.01); *B29K 2105/122* (2013.01); *B29K 2105/251* (2013.01); *B29K 2307/04* (2013.01); *B29K 2505/02* (2013.01); *B29K 2995/0013* (2013.01)

(58) Field of Classification Search
  CPC ........ B29K 2105/122; B29K 2105/251; B29K 2307/04; B29K 2505/02; B29K 2995/0013
  See application file for complete search history.

(56) References Cited

U.S. PATENT DOCUMENTS

| | | | |
|---|---|---|---|
| 2005/0040552 A1* | 2/2005 | Gemberling | B29C 31/02 264/40.1 |
| 2011/0045300 A1* | 2/2011 | Tamaoki | H01L 23/373 428/408 |
| 2011/0085869 A1* | 4/2011 | Onozuka | B23Q 11/0035 409/145 |

FOREIGN PATENT DOCUMENTS

| | | | | |
|---|---|---|---|---|
| CN | 105346101 A | 2/2016 | | |
| CN | 106810876 A | 6/2017 | | |
| CN | 108192352 A | 6/2018 | | |
| CN | 108504016 A | 9/2018 | | |
| FR | 2887961 | * | 1/2006 | .............. F21V 14/08 |
| JP | 2009295921 A | 12/2009 | | |
| TW | M539993 U | * | 4/2017 | |

* cited by examiner

DEVICE FOR PREPARING THERMALLY CONDUCTIVE SHEET WITH GRAPHENE FIBERS IN AN ORIENTED ARRANGEMENT

CROSS REFERENCE TO THE RELATED APPLICATIONS

This application is the national phase entry of International Application No. PCT/CN2020/078635, filed on Mar. 10, 2020, which is based upon and claims priority to Chinese Patent Application No. 201911130092.4, filed on Nov. 18, 2019, the entire contents of which are incorporated herein by reference.

TECHNICAL FIELD

The present invention relates to the technical field of devices for preparing thermally conductive sheets, and in particular, to a device for preparing a thermally conductive sheet with graphene fibers in an oriented arrangement.

BACKGROUND

Big data, 5G, artificial intelligence (AI) and the Internet of things have created increased demand for better performing power sources, which in turn, require more highly developed heat dissipation materials and components. In this regard, it is necessary to improve the heat transfer efficiency of thermal interface materials. Conventional thermally conductive sheets have been unable to meet the functional requirements. Thus, it is desirable to develop a new thermally conductive sheet with a higher thermal conductivity to meet the increasing heat dissipation requirements.

Current thermally conductive sheets are typically filled with a large amount of inorganic powder, which negatively impacts physical properties such as flexibility, toughness and elasticity of the pad. The thermal conductivities of traditional filler powders, such as alumina, aluminum nitride, boron nitride and others, are all less than 300 W/m·k, and thermally conductive sheets filled with such traditional filler powders generally have a thermal conductivity lower than 10 W/m·k. Furthermore, when having a thermal conductivity exceeding 8 W/m·k, the thermally conductive sheets have poor temperature resistance and stability. Therefore, it is highly desirable to develop an improved device for preparing a thermally conductive sheet with improved thermal conductivity.

SUMMARY

The present invention provides a device for preparing a thermally conductive sheet with graphene fibers in an oriented arrangement to produce a thermally conductive sheet with high thermal conductivity.

A device for preparing a thermally conductive sheet with graphene fibers in an oriented arrangement includes a first mold and a second mold.

The first mold is configured to press a first cuboid block, and the second mold is configured to repeatedly press the first cuboid block pressed by the first mold.

Preferably, the first mold is provided with a first mold groove. A first mold cover covers an opening end of the first mold groove, and the first mold cover and the first mold are configured to press the first cuboid block.

Preferably, a second mold groove is arranged on one side of the second mold, and a second mold cover is arranged at an opening end of the second mold groove.

A thickness limiting block is arranged at a side of the second mold cover adjacent to the second mold groove, and the thickness limiting block is configured to be clamped in the second mold groove.

Preferably, the first cuboid block is made of a high-thermal conductivity mixture, and the high-thermal conductivity mixture includes a mixture of matrix resin, carbon fiber and thermally conductive powder.

Preferably, the second mold groove includes a concave portion and a convex portion, and is provided with openings on both sides. The movable thickness limiting block can be placed at the openings on both sides of the second mold groove. The width of the second mold groove of the second mold is identical to the width of the first mold.

Preferably, the device further includes an operating table, a flipping device and a cutting table. The first mold, the second mold, the flipping device and the cutting table are all arranged on the upper surface of the operating table. The operating table is a flat-plate structure, and supporting legs are arranged under the operating table.

The flipping device is arranged on one side of the first mold and the second mold. The cutting table is arranged on one side of the flipping device. The cutting table is provided with a cutting plate, and the cutting plate is arranged adjacent to the second mold.

The flipping device is configured to flip the second mold upside down on the cutting plate, and the cutting table is configured to cut the first cuboid block on the cutting plate.

Preferably, the flipping device includes a flipping driving device, a sprocket, a first rotating shaft and a flipping plate.

The flipping driving device is fixed above the operating table through a second fixed rod standing on the upper surface of the operating table. A retractable end of the flipping driving device is connected to a first connecting rod, and the other end of the first connecting rod is connected to a chain. An end of the chain away from the first connecting rod is fixed to one of gears in the circumferential direction of the sprocket.

The axial center of the sprocket is connected to the first rotating shaft, and two ends of the first rotating shaft are fixed above the operating table through a first fixed plate standing on the operating table. The first fixed plate is provided with a through hole configured for the first rotating shaft to rotate.

An end of the first rotating shaft adjacent to the second mold is provided with an extension portion, and an end of the extension portion away from the first fixed plate is connected to the flipping plate. A spring is sleeved on the extension portion. One end of the spring is fixed on the outer side of the first fixed plate, and the other end of the spring is fixed on the flipping plate.

An end of the flipping plate away from the spring is connected to a clamping driving device, and a retractable end of the clamping driving device is connected to a mold clamp. The mold clamp is configured to clamp or release the second mold.

Preferably, the mold clamp includes a third connecting rod, a connecting table and a clamping assembly. The connecting table is configured to connect the clamping assembly and the third connecting rod. An end of the third connecting rod away from the connecting table is connected to the clamping driving device.

The clamping assembly is symmetrically arranged on both sides of the connecting table and is configured to clamp or release the second mold. A housing is arranged outside the clamping assembly and the connecting table, and the housing is configured to install the clamping assembly and the connecting table as a whole.

The clamping assembly includes a first clamping block, a second clamping block and a second connecting rod. A clamping head is arranged at one end of the first clamping block, and a first movement groove is arranged at the other end of the first clamping block. A second movement groove is arranged at one end of the second clamping block, and the other end of the second clamping block is movably connected to the connecting table.

The second connecting rod is arranged in the first movement groove and the second movement groove, and the second connecting rod is rotatably connected in the first movement groove and the second movement groove by a connecting shaft.

Two connecting shafts are arranged on each of the first clamping block and the second clamping block, and the connecting shafts are fixed on the inner wall of the housing.

Specifically, one connecting shaft is configured for the second connecting rod to move in the first movement groove and the second movement groove, and the other connecting shaft is configured for the first clamping block and the second clamping block to rotate around the connecting shaft. The connecting shaft configured for the first clamping block and the second clamping block to rotate is arranged adjacent to the connecting table.

A connecting pipe is arranged at an end of the second clamping block away from the second connecting rod. A second rotating shaft is arranged in the connecting table. The connecting pipe is rotatably sleeved on the circumferential outer wall of the second rotating shaft. A third movement groove is arranged inside the connecting table, and the third movement groove is configured for the second clamping block to rotate on both sides of the connecting table.

Preferably, the cutting table includes a connecting rod assembly, a base and a cutter head, and the lower surface of the base is slidably arranged on a first slide rail.

One end of the first slide rail is connected to the cutting plate. A ninth connecting rod is arranged on a side of the base away from the cutting plate, and the ninth connecting rod is configured to connect a driving device of the cutting table.

A third rotating shaft penetrates the base and is rotatably arranged at an end of the base adjacent to the ninth connecting rod. One end of the third rotating shaft is connected to a motor, the other end of the third rotating shaft is connected to one end of a fourth connecting rod, and the other end of the fourth connecting rod is rotatably connected to one end of a fifth connecting rod.

The other end of the fifth connecting rod is rotatably connected to one end of a sixth connecting rod, and the other end of the sixth connecting rod is connected to an eighth connecting rod.

The top of a side of the base adjacent to the cutting plate extends outward and is provided with a cutter head limiting table, and the top of the base is provided with a connecting rod limiting table.

The connecting rod limiting table is a triangular structure. A seventh connecting rod is rotatably arranged at the outside of an end of the triangular structure away from the base, and the other end of the seventh connecting rod is rotatably connected to the center of the sixth connecting rod.

Preferably, a backing plate is arranged under the cutting plate, and a second slide rail is arranged on the upper surface of the backing plate.

Rollers are arranged at intervals on the lower surface of the cutting plate, and the rollers reciprocate in the second slide rail.

A movement cavity penetrates the center of the cutting plate. A rack plate is arranged on the upper surface and the lower surface of the movement cavity, respectively. The ninth connecting rod is configured as a threaded rod, and the base is provided with a threaded hole that is adapted to a thread of the ninth connecting rod.

An end of the ninth connecting rod away from a driving motor is rotatably connected to a fourth rotating shaft. An end of the fourth rotating shaft away from the ninth connecting rod is fixed to a rotating disc. The rotating disc is provided with meshing teeth, and the meshing teeth are arranged at intervals on the circumferential outer wall of the rotating disc.

A distribution angle of the meshing teeth on the circumferential outer wall of the rotating disc is 100°-135°.

The present invention has the following advantages.

Fibrous and sheet carbon materials, such as carbon fibers, graphite sheets, graphene and so on have good thermal conductivity. The axial thermal conductivity of carbon fiber can reach 600-1200 W/m·k. Theoretically, the in-plane thermal conductivity of the sheet-shaped graphene can reach 5000 W/m·k. If such carbon materials can be orderly oriented and distributed in the thermally conductive sheet, their thermal conductive efficiency will be higher than that of those thermally conductive sheets filled with powder, so as to improve the thermal conductivity significantly. The thermally conductive sheet prepared by the method for preparing the thermally conductive sheet according to the present invention obtains relatively high conductivity after the fourth cuboid block is repeatedly oriented in the arrangement by repeatedly using the second mold, thereby greatly improving the thermal conductivity of the thermally conductive sheet.

Other features and advantages of the present invention will be explained in the following description and will become partly apparent from the description or be understood through the implementation of the present invention. The objectives and other advantages of the present invention can be realized and obtained by the structure specifically pointed out in the description, claims, and drawings.

The technical solutions of the present invention are further described below in detail with reference to the drawings and embodiments.

BRIEF DESCRIPTION OF THE DRAWINGS

The drawings are used to provide a further understanding of the present invention together with the embodiments of the present invention to explain the present invention, and form part of the specification, but do not constitute a limitation to the present invention.

In the figures: 1—first mold, 2—first mold groove, 3—first cuboid block, 4—first mold cover, 5—second mold, 6—second mold groove, 7—second mold cover, 8—second elongated block, 9—third elongated block, 10—fourth cuboid block, 11—fifth cuboid block, 12—thickness limiting block, 13—operating table, 14—flipping driving device, 15—first connecting rod, 16—chain, 17—sprocket, 18—clamping driving device, 19—spring, 20—flipping plate, 21—mold clamp, 22—first rotating shaft, 23—first fixed plate, 24—first slide rail, 25—second fixed rod, 26—cutting table, 27—cutting plate, 28—clamping head, 29—first clamping block, 30—first movement groove, 31—second connecting rod, 32—third connecting rod, 33—connecting table, 34—second clamping block, 35—connecting shaft, 36—second movement groove, 37—housing, 38—second rotating shaft, 39—third movement groove, 41—connecting pipe, 42—third rotating shaft, 43—fourth connecting rod, 44—fifth connecting rod, 45—sixth connecting rod, 46—seventh connecting rod, 47—eighth connecting rod, 48—cutter head, 49—base, 50—cutter head limiting table, 51—connecting rod limiting table, 52—ninth connecting rod, 53—rack plate, 54—meshing teeth, 55—fourth rotating shaft, 56—rotating disc, 57—roller, 58—backing plate, 59—second slide rail, 60—movement cavity.

DETAILED DESCRIPTION OF THE EMBODIMENTS

The preferred embodiments of the present invention are illustrated below with reference to the drawings. It should be understood that the preferred embodiments described herein are only used to illustrate and explain the present invention rather than to limit the present invention.

As shown in FIGS. 1-4, an embodiment of the present invention provides a device for preparing a thermally conductive sheet with graphene fibers in an oriented arrangement, including the first mold 1 and the second mold.

The first mold 1 is configured to press the first cuboid block 3, and the second mold is configured to repeatedly press the first cuboid block 3 pressed by the first mold 1.

Fibrous and sheet carbon materials, such as carbon fibers, graphite sheets, graphene and so on have good thermal conductivity. The axial thermal conductivity of carbon fiber can reach 600-1200 W/m·k. Theoretically, the in-plane thermal conductivity of the sheet-shaped graphene can reach 5000 W/m·k. If such carbon materials can be orderly oriented and distributed in the thermally conductive sheet, their thermal conductive efficiency will be higher than that of those thermally conductive sheets filled with powder, so as to improve the thermal conductivity significantly. The thermally conductive sheet prepared by the method for preparing the thermally conductive sheet according to the present invention obtains relatively high conductivity after the fourth cuboid block 10 is repeatedly oriented in the arrangement by repeatedly using the second mold, thereby greatly improving the thermal conductivity of the thermally conductive sheet.

As shown in FIGS. 1-4, the first mold 1 is provided with the first mold groove 2. The first mold cover 4 covers the opening end of the first mold groove 2, and the first mold cover 4 and the first mold 1 are configured to press the first cuboid block 3.

As shown in FIGS. 1-4, the second mold groove 6 is arranged on one side of the second mold, and the second mold cover 7 is arranged at the opening end of the second mold groove 6.

The thickness limiting block 12 is arranged at a side of the second mold cover 7 adjacent to the second mold groove 6, and the thickness limiting block 12 is configured to be clamped in the second mold groove 6.

As shown in FIGS. 1-4, the first cuboid block 3 is made of a high-thermal conductivity mixture, and the high-thermal conductivity mixture includes a mixture of matrix resin, carbon fiber and thermally conductive powder.

As shown in FIGS. 1-4, the second mold groove 6 includes a concave portion and a convex portion and is provided with openings on both sides. The movable thickness limiting block 12 can be placed at the openings on both sides of the second mold groove. The width of the second mold groove 6 of the second mold is identical to the width of the first mold 1.

The present invention further includes a method for preparing a thermally conductive sheet with high thermal conductivity, including the following steps:

step 1, a high-thermal conductivity mixture is prepared;

step 2, the high-thermal conductivity mixture is added into the first mold groove 2 of the first mold 1;

step 3, the first mold cover 4 covers the opening end of the first mold groove 2 of the first mold 1; at room temperature, the first mold cover 4 molds the high-thermal conductivity mixture in the first mold groove 2 of the first mold 1 for 5-15 minutes to form the first cuboid block 3;

step 4, the first mold cover 4 is removed, and the molded first cuboid block 3 is taken out of the first mold groove 2 of the first mold 1;

step 5, the first cuboid block 3 is put into the second mold groove 6 of the second mold, and the second mold cover 7 molds the two sides and the top of the first cuboid block 3 for 5-15 minutes to form the second elongated block 8;

step 6, the second mold cover 7 is removed, and the molded second elongated block 8 is taken out of the second mold groove 6 of the second mold;

step 7, the second elongated block 8 is cut along the length direction of the second elongated block 8 to form a plurality of third elongated blocks 9;

step 8, the third elongated block 9 is cut along the orientation direction of the third elongated block 9 to form a plurality of fourth cuboid blocks 10;

step 9, the fourth cuboid block 10 is put into the second mold groove 6 of the second mold, and the top of the second mold cover 7 and the thickness limiting block 12 on both sides mold the fourth cuboid block 10 for 5-15 minutes to form the fifth cuboid block 11;

step 10, the fifth cuboid block 11 is taken out of the second mold groove 6 of the second mold and is then cured in an oven for 0.8-1.6 hours; and step 11, the fifth cuboid block 11 is taken out of the oven, and is sliced along the direction perpendicular to the orientation direction by using a slicing cutter to finally obtain the thermally conductive sheet oriented in the thickness direction.

Embodiment 1

The carbon fibers used in the present embodiment have an average diameter of 10 m and an average length of 150 m. The carbon fibers in this size have little effect on the viscosity of the mixed high-thermal conductivity mixture, and are easy to be oriented in the arrangement in the flow process. Silica gel used as the matrix resin, necessary thermally conductive powder such as aluminum powder and alumina, and fibrous carbon fibers are added and mixed evenly in an agitator to obtain the high-thermal conductivity mixture.

The high-thermal conductivity mixture is added into the first mold groove 2 of the first mold 1, wherein the first mold groove has a length of 100 mm, a width of 100 mm and a height of 100 mm, and the high-thermal conductivity mixture is molded in the first mold groove 2 of the first mold 1 at room temperature for 10 minutes by using the first mold cover 4 to obtain the first cuboid block 3 with a size 100 mm*100 mm*100 mm.

The first cuboid block 3 is put into the second mold groove 6 of the second mold 5, wherein the second mold groove has a width of 100 mm and a length of 600 mm, the thickness limiting block 12 with a thickness of 20 mm is placed on both sides of the second mold 5, and the first cuboid block 3 is molded by using the second mold cover 7 for 10 minutes to obtain the second elongated block 8 with a size of 500 mm*100 mm*20 mm.

The second elongated block 8 is cut into five third elongated blocks 9 each with a size of 100 mm*100 mm*20 mm along the length direction, i.e., the orientation direction. The five third elongated blocks 9 are superimposed along the orientation direction to obtain the fourth cuboid block 10.

The fourth cuboid block 1010 is put into the second mold groove 6 of the second mold 5, and the orientation direction of the fourth cuboid block 1010 is identical to the length direction of the second mold groove 6. The thickness limiting block 12 with a thickness of 40 mm is placed on both sides of the second mold groove 6. The fourth cuboid block 1010 is molded for 10 minutes to obtain the fifth cuboid block 11 with a size of 40 mm*100 mm*250 mm. The fifth cuboid block 11 is cured in an oven at 140 degrees Celsius for 1 hour, and then is taken out and sliced along the direction perpendicular to the orientation direction by using a slicing cutter to obtain the thermally conductive sheet oriented in the thickness direction. The thermal conductivity of the thermally conductive sheet with a thickness of 1 mm is measured to be 12 W/m·k according to the ASTM D 5470 standard.

Embodiment 2

The fourth cuboid block 1010 obtained according to Embodiment 1 is put into the second mold groove 6 of the second mold 5. The orientation direction of the fourth cuboid block 1010 is identical to the length direction of the second mold groove 6. The fourth cuboid block 1010 is molded to obtain the second elongated block 8 again. The second elongated block 8 is cut into the third elongated blocks 9, and the third elongated blocks 9 are superimposed again along the orientation direction to obtain the fourth cuboid block 1010. The fourth cuboid block 1010 is put into the second mold groove 6 of the second mold 5, and the orientation direction of the fourth cuboid block 1010 is identical to the length direction of the second mold groove 6. The fourth cuboid block 1010 is molded for 10 minutes to obtain the fifth cuboid block 11 with a size of 40 mm*100 mm*250 mm. The curing and cutting process of the fifth cuboid block 11 is the same as that of Embodiment 1. Finally, the thermal conductivity of the thermally conductive sheet with a thickness of 1 mm is measured to be 16 W/m·k.

Embodiment 3

Embodiment 2 has one more molding orientation operation than Embodiment 1. On basis of Embodiment 2, Embodiment 3 additionally performs one molding orientation operation again on the fourth cuboid block 1010. Other processes of Embodiment 3 are the same as those of Embodiment 2. Finally, the thermal conductivity of the thermally conductive sheet with the thickness of 1 mm is measured to be 18 W/m·k.

Comparative Embodiment

The present embodiment is a comparative embodiment. The preparation of the high-thermal conductivity mixture is the same as that of Embodiment 1. The high-thermal conductivity mixture is directly molded into a thermally conductive sheet with the thickness of 1 mm by using a plate molding machine, and the thermal conductivity thereof is measured to be 5 W/m·k.

The measurement result of Comparative Embodiment shows that the thermally conductive sheet with the carbon fibers in the oriented arrangement cannot be obtained by ordinary compression molding, and the carbon fibers are arranged in a disordered state in the pad. As a result, the thermal conductivity of the thermally conductive sheet cannot achieve the desired level.

In the embodiments of the present invention, the compression flow direction of the material is controlled in a specific mold, so that the carbon fibers therein are oriented in a certain direction. Additionally, Embodiment 2 and Embodiment 3 increase the number of molding orientation operations, which can improve the thermal conductivity of the thermally conductive sheet finally obtained, indicating that increasing the number of molding orientation operations can improve the orderliness of the carbon fibers.

The carbon fibers used in the present embodiment have an average diameter of 10 µm and an average length of 150 µm. The carbon fibers in this size have little effect on the viscosity of the mixed high-thermal conductivity mixture, and are easy to be oriented in the arrangement in the flow process. Silica gel used as the matrix resin, necessary thermally conductive powder such as aluminum powder and alumina, and fibrous carbon fibers are added and mixed evenly in the agitator to obtain the high-thermal conductivity mixture.

The high-thermal conductivity mixture is added into the first mold with a length of 100 mm, a width of 100 mm and a height of 100 mm, and is molded at room temperature for 10 minutes to obtain the first cuboid block.

The first cuboid block is put into a groove of the second mold. The groove has a width of 100 mm and a length of 600 mm. The thickness limiting block 12 with a thickness of 20 mm is placed on both sides of the second mold. The cuboid block 1 is molded for 10 minutes to obtain the second elongated block with a size of 500 mm*100 mm*20 mm.

The second elongated block is cut into five small third elongated blocks each with a size of 100 mm*100 mm*20 mm along the length direction, i.e., the orientation direction. The five small third elongated blocks are superimposed along the orientation direction to obtain the fourth cuboid block.

The fourth cuboid block is put into the groove of the second mold, and the orientation direction of the fourth cuboid block is identical to the length direction of the groove. The thickness limiting block 12 with a thickness of 40 mm is placed on both sides of the groove. The fourth cuboid block is molded for 10 minutes to obtain the fifth cuboid block with a size of 40 mm*100 mm*250 mm. The fifth cuboid block is cured in an oven at 140 degrees Celsius for 1 hour, and then is taken out and sliced along the direction perpendicular to the orientation direction by using a slicing cutter to obtain the thermally conductive sheet oriented in the thickness direction. The thermal conductivity of the thermally conductive sheet with a thickness of 1 mm is measured to be 12 W/m·k according to the ASTM D 5470 standard.

Embodiment 2

The fourth cuboid block obtained according to Embodiment 1 is put into the second mold. The orientation direction of the fourth cuboid block is identical to the length direction of the groove. The fourth cuboid block is molded to obtain the second elongated block again. The second elongated block is cut into the small third elongated blocks, and the small third elongated blocks are superimposed again along the orientation direction to obtain the fourth cuboid block. The fourth cuboid block is put into the second mold, and the orientation direction of the fourth cuboid block is identical to the length direction of the groove. The fourth cuboid block is molded for 10 minutes to obtain the fifth cuboid block with a size of 40 mm*100 mm*250 mm. The curing and cutting process of the fifth cuboid block is the same as that of Embodiment 1. Finally, the thermal conductivity of the thermally conductive sheet with the thickness of 1 mm is measured to be 16 W/m·k.

Embodiment 3

Embodiment 2 has one more molding orientation operation than Embodiment 1. On basis of Embodiment 2, Embodiment 3 additionally performs one molding orientation operation again on the fourth cuboid block. Other processes of Embodiment 3 are the same as those of Embodiment 2. Finally, the thermal conductivity of the thermally conductive sheet with the thickness of 1 mm is measured to be 18 W/m·k.

Comparative Embodiment

The present embodiment is a comparative embodiment. The preparation of the high-thermal conductivity mixture is the same as that of Embodiment 1. The high-thermal conductivity mixture is directly molded into a thermally conductive sheet with the thickness of 1 mm by using a plate molding machine, and the thermal conductivity thereof is measured to be 5 W/m·k.

The measurement result of Comparative Embodiment shows that the thermally conductive sheet with the carbon fibers in the oriented arrangement cannot be obtained by ordinary compression molding, and the carbon fibers are arranged in a disordered state in the pad. As a result, the thermal conductivity of the thermally conductive sheet cannot achieve the desired level.

In the embodiments of the present invention, the compression flow direction of the material is controlled in a specific mold, so that the carbon fibers therein are oriented in a certain direction. Additionally, Embodiment 2 and Embodiment 3 increase the number of molding orientation operations, which can improve the thermal conductivity of the thermally conductive sheet finally obtained, indicating that increasing the number of molding orientation operations can improve the orderliness of the carbon fibers.

In another embodiment, as shown in FIGS. 5-10, the present invention further includes the operating table 13, the flipping device and the cutting table 26. The first mold 1, the second mold, the flipping device and the cutting table 26 are all arranged on the upper surface of the operating table 13. The operating table 13 is a flat-plate structure, and supporting legs are arranged under the operating table 13.

The flipping device is arranged on one side of the first mold 1 and the second mold. The cutting table 26 is arranged on one side of the flipping device. The cutting table 26 is provided with the cutting plate 27, and the cutting plate 27 is arranged adjacent to the second mold.

The flipping device is configured to flip the second mold upside down on the cutting plate 27, and the cutting table 26 is configured to cut the first cuboid block 3 on the cutting plate 27.

During the working process, the high-thermal conductivity mixture is first put into the first mold groove 2 of the first mold 1, and covered and pressed for a period of time by using the first mold cover 4, so that the high-thermal conductivity mixture is molded in the first mold groove 2 of the first mold 1 to form the first cuboid block 3. Then, the first cuboid block 3 is taken out of the first mold groove 2. After that, the first cuboid block 3 is put into the second mold groove 6 of the second mold for secondary molding to form the second elongated block 8. Then, the second elongated block 8 in the second mold is flipped upside down on the cutting table 26 by the flipping device, and the cutting table 26 cuts the second elongated block 8 along the length direction to form the third elongated blocks 9. Subsequently, the cutting table 26 cuts the third elongated block 9 along the length direction of the third elongated block 9 to form the fourth cuboid block 10. As needed, optionally, the fourth cuboid block 10 continues to be molded in the second mold groove 6 or the first mold groove 2 to form the fifth cuboid block 11, and the molded fifth cuboid block 11 is put into an oven for curing to form a thermally conductive block. The cured thermally conductive block is cut along the thickness direction thereof to form a thermally conductive sheet.

The first mold 1 and the second mold are placed on the operating table 13, the flipping device is configured to move and flip the workpiece in the second mold upside down on the cutting table 26, and the cutting table 26 is configured to repeatedly cut the workpiece, thereby finally realizing the purpose of improving the thermal conductivity of the workpiece. In this way, the number of manual operations between the first mold 1, the second mold and the cutting table 26 is reduced, thereby greatly improving the production efficiency of the thermally conductive sheet.

As shown in FIGS. 5-10, the flipping device includes the flipping driving device 14, the sprocket 17, the first rotating shaft 22 and the flipping plate 20.

The flipping driving device 14 is fixed above the operating table 13 through the second fixed rod 25 standing on the upper surface of the operating table 13. The retractable end of the flipping driving device 14 is connected to the first connecting rod 15, and the other end of the first connecting rod 15 is connected to the chain 16. The end of the chain 16 away from the first connecting rod 15 is fixed to one of the gears in the circumferential direction of the sprocket 17.

The axial center of the sprocket 17 is connected to the first rotating shaft 22, and the two ends of the first rotating shaft 22 are fixed above the operating table 13 through the first fixed plate standing on the operating table 13. The first fixed plate is provided with a through hole configured for the first rotating shaft 22 to rotate.

The end of the first rotating shaft 22 adjacent to the second mold is provided with an extension portion, and the end of the extension portion away from the first fixed plate is connected to the flipping plate 20. The spring 19 is sleeved on the extension portion. One end of the spring 19 is fixed on the outer side of the first fixed plate, and the other end of the spring 19 is fixed on the flipping plate 20.

The end of the flipping plate 20 away from the spring 19 is connected to the clamping driving device 18, and the retractable end of the clamping driving device 18 is connected to the mold clamp 21. The mold clamp 21 is configured to clamp or release the second mold 2.

Figure 1:
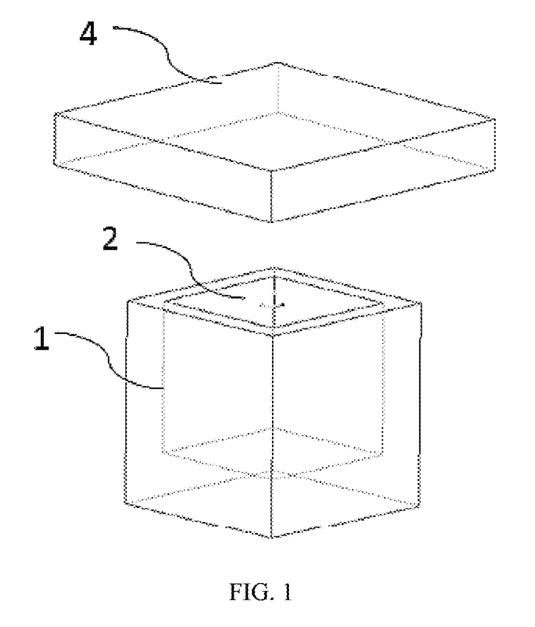
FIG. 1 is a schematic diagram of the structure of the first mold according to the present invention.
Figure 2:
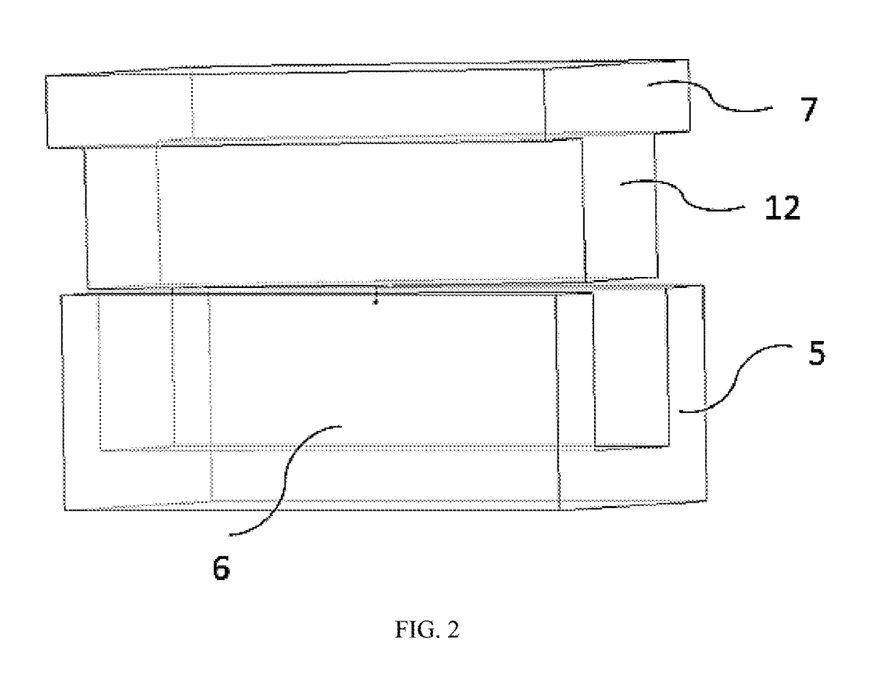
FIG. 2 is a schematic diagram of the structure of the second mold according to the present invention.
Figure 3:
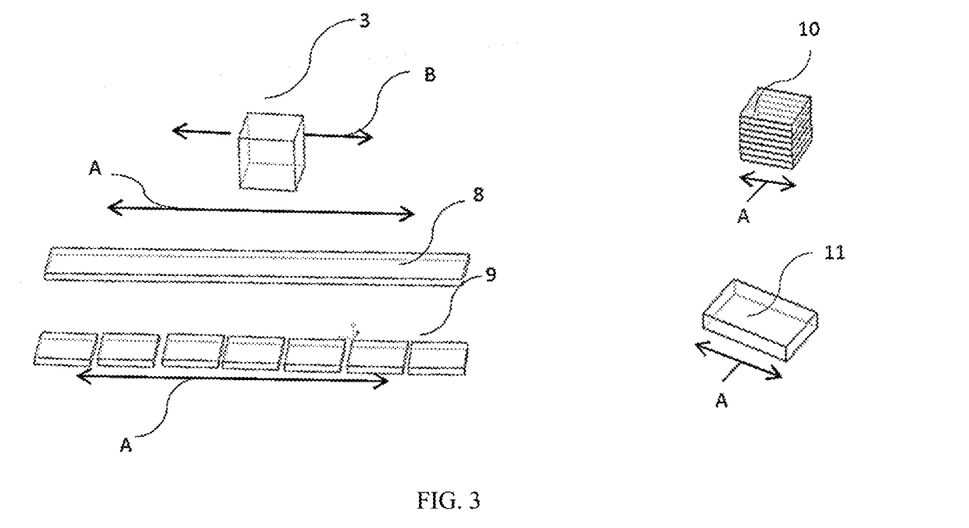
FIG. 3 is a schematic diagram of the preparation form and structure of the thermally conductive sheet according to the present invention.
Figure 4:
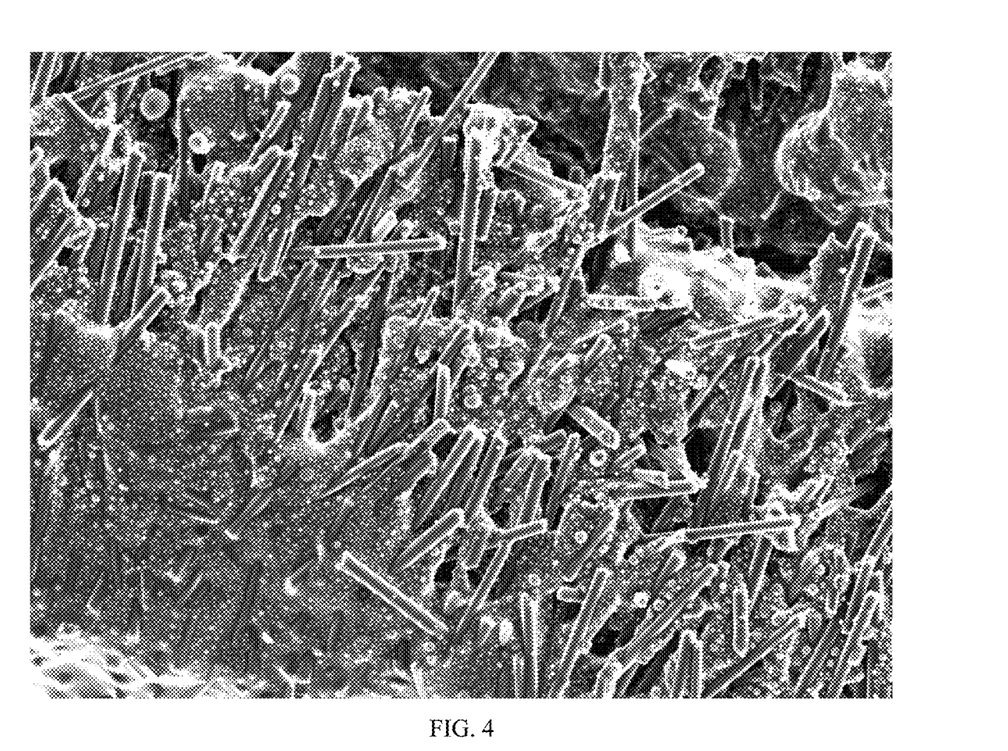
FIG. 4 is an electron micrograph of the oriented thermally conductive sheet according to the present invention.
Figure 5:
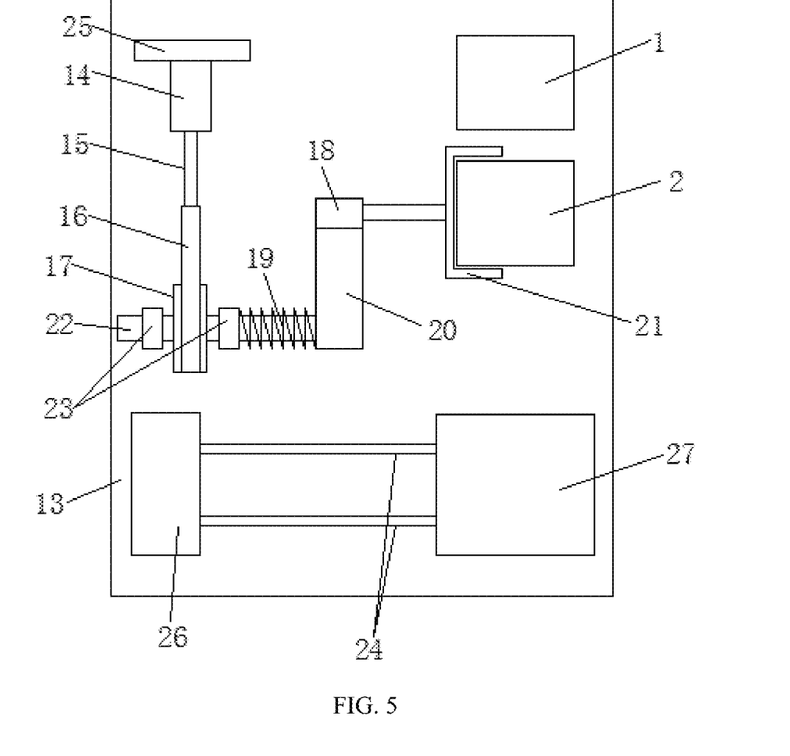
FIG. 5 is a top view of the operating table according to the present invention.
Figure 6:
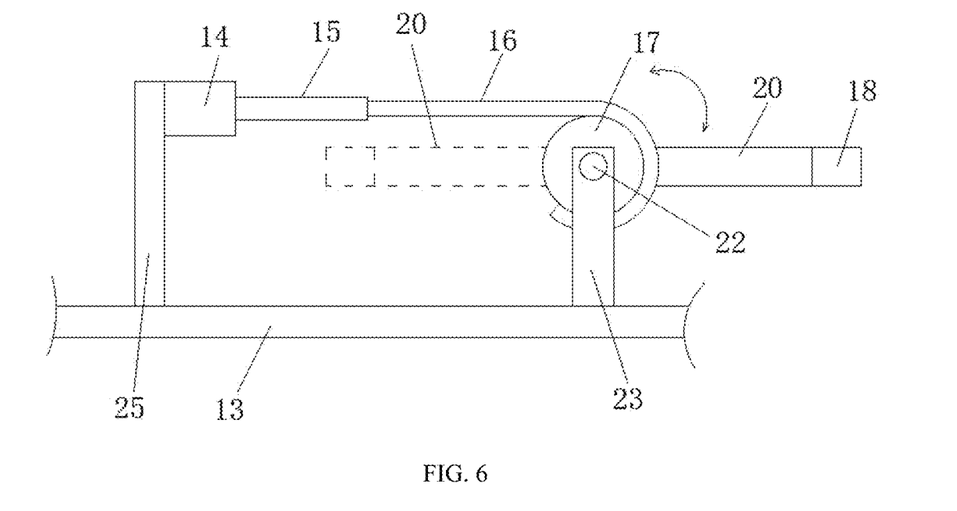
FIG. 6 is a schematic diagram of the structure of the flipping device according to the present invention.
Figure 7:
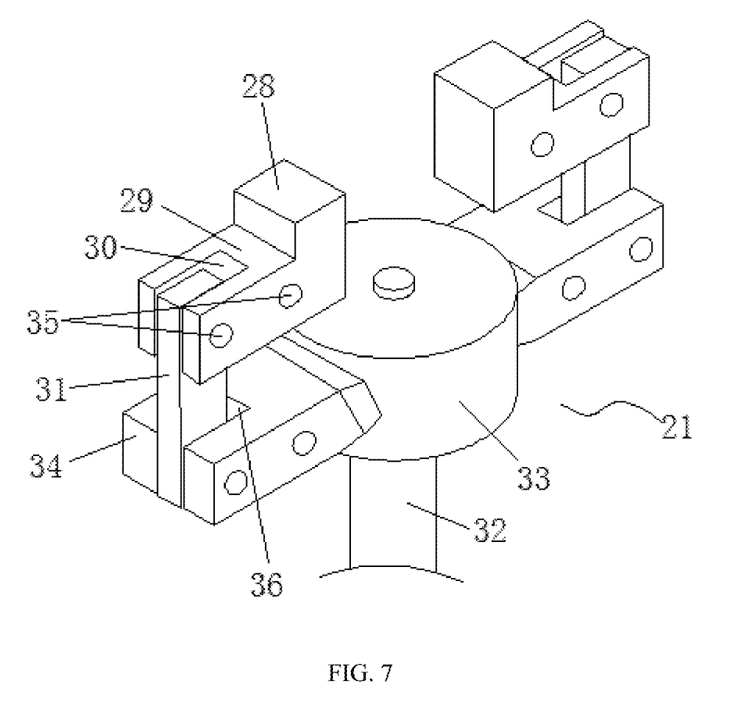
FIG. 7 is a three-dimensional view of the mold clamp according to the present invention.
Figure 8:
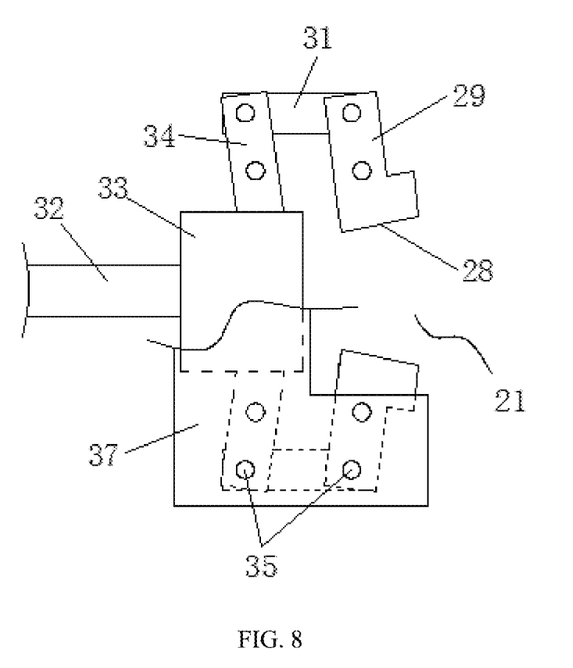
FIG. 8 is a schematic diagram of the structure of the housing of the mold clamp according to the present invention.
Figure 9:
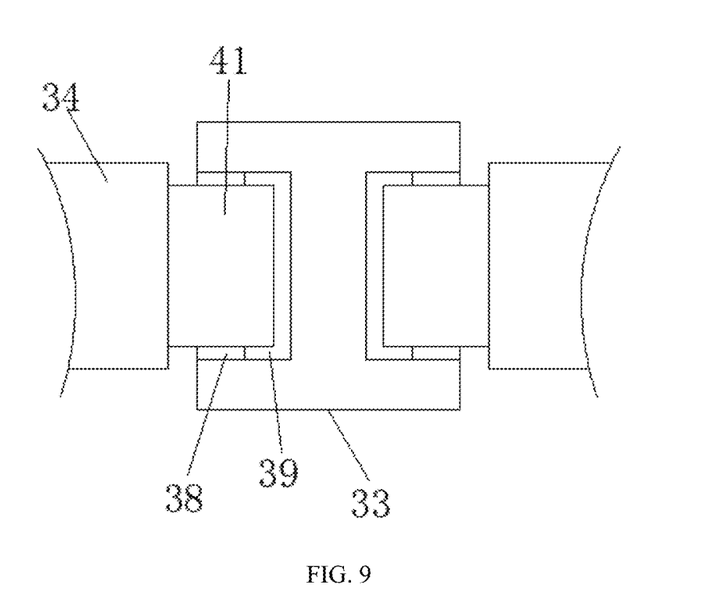
FIG. 9 is a schematic diagram of the structure of the connecting table according to the present invention.

During the working process, as shown in FIGS. 5-6, the flipping driving device 14 is first started. After the flipping driving device 14 works, the first connecting rod 15 moves toward the sprocket 17. The spring 19 is a torsion spring, and the torsion spring is linked with the first connecting rod 15 through the sprocket 17 and the chain 16. Once the first connecting rod 15 moves toward the sprocket 17, the torsion spring drives the flipping plate 20 to flip. When the flipping driving device 14 drives the first connecting rod 15 to retract completely, the length of the first connecting rod 15 is the shortest, and the length of the chain 16 is the longest. When the flipping driving device 14 drives the first connecting rod 15 to extend, the chain 16 is released from the pulling of the flipping driving device 14 and rolls around the sprocket 17 under the force of the torsion spring. The sprocket 17 rotates on the first fixed plate 23 with the first rotating shaft 22, thereby flipping the flipping plate 20. The flipping plate 20 flips to drive the mold clamp 21 to flip, thereby realizing that the mold clamp 21 clamps the second mold and flips the second mold on the cutting table 26 for cutting the workpiece. The workpiece in the present invention is the high-thermal conductivity mixture used to prepare the thermally conductive sheet. The workpiece can be the first cuboid block 3, the second elongated block 8, the third elongated block 9, the fourth cuboid block 10, the fifth cuboid block 11, etc., which are molded by the first mold 1 or the second mold. Alternatively, the workpiece can also be a block formed by repeatedly molding the fifth cuboid block 11 in the first mold 1 and the second mold. The flipping driving device 14 is preferably a hydraulic cylinder or a linear driving device.

As shown in FIGS. 5-9, the mold clamp 21 includes the third connecting rod 32, the connecting table 33 and the clamping assembly. The connecting table 33 is configured to connect the clamping assembly and the third connecting rod 32. The end of the third connecting rod 32 away from the connecting table 33 is connected to the clamping driving device 18.

The clamping assembly is symmetrically arranged on both sides of the connecting table 33 and is configured to clamp or release the second mold. The housing 37 is arranged outside the clamping assembly and the connecting table 33, and the housing 37 is configured to install the clamping assembly and the connecting table 33 as a whole.

The clamping assembly includes the first clamping block 29, the second clamping block 34 and the second connecting rod 31. The clamping head 28 is arranged at one end of the first clamping block 29, and the first movement groove 30 is arranged at the other end of the first clamping block 29. The second movement groove 36 is arranged at one end of the second clamping block 34, and the other end of the second clamping block 34 is movably connected to the connecting table 33.

The second connecting rod 31 is arranged in the first movement groove 30 and the second movement groove 36, and the second connecting rod 31 is rotatably connected in the first movement groove 30 and the second movement groove 36 by the connecting shaft 35.

Two connecting shafts 35 are arranged on each of the first clamping block 29 and the second clamping block 34, and the connecting shafts 35 are fixed on the inner wall of the housing 37.

Specifically, one connecting shaft 35 is configured for the second connecting rod 31 to move in the first movement groove 30 and the second movement groove 36, and the other connecting shaft 35 is configured for the first clamping block 29 and the second clamping block 34 to rotate around the connecting shaft 35. The connecting shaft 35 configured for the first clamping block 29 and the second clamping block 34 to rotate is arranged adjacent to the connecting table 33.

The connecting pipe 41 is arranged at the end of the second clamping block 34 away from the second connecting rod 31. The second rotating shaft 38 is arranged in the connecting table 33. The connecting pipe 41 is rotatably sleeved on the circumferential outer wall of the second rotating shaft 38. The third movement groove 39 is arranged inside the connecting table 33, and the third movement groove 39 is configured for the second clamping block 34 to rotate on both sides of the connecting table 33.

During the working process, the driving end of the clamping driving device 18 is connected to the third connecting rod 32. The third connecting rod 32 is driven by the clamping driving device 18 to reciprocate, namely, the clamping assembly symmetrically arranged on both sides of the third connecting rod 32 is configured for driving the third connecting rod 32, so that the second mold is clamped by the clamping assembly.

When the third connecting rod 32 is pushed toward the clamping assembly, the clamping assembly is in a releasing state. When the third connecting rod 32 retracts toward the clamping driving device 18, the clamping assembly is in a clamping state.

During the clamping process, the third connecting rod 32 moves toward the clamping driving device 18. The first clamping block 29 and the second clamping block 34 are both rotatably arranged on the inner wall of the housing 37 through the connecting shaft 35, the second clamping block 34 and the connecting table 33 are movably connected, and the connecting table 33 and the third connecting rod 32 are fixedly connected. Therefore, when the third connecting rod 32 performs a clamping operation, the second connecting rod 31 moves in the first movement groove 30 of the first clamping block 29 and the second movement groove 36 of the second clamping block 34 toward the third connecting rod 32 through the connecting shaft 35. Meanwhile, the first clamping block 29 and the second clamping block 34 are also linked with the connecting shaft 35 adjacent to the clamping head 28, so that the clamping heads 28 can move toward the axial center of the third connecting rod 32 separately for clamping.

During the releasing process, the third connecting rod 32 moves toward the clamping head 28, and the second clamping block 34 is first rotated on the connecting table 33 through the second rotating shaft 38, the third movement groove 39 and the connecting pipe 41. As a result, the second clamping block 34 rotates around the connecting shaft 35 adjacent to the connecting table 33. Meanwhile, the second clamping block 34 moves to drive the second connecting rod 31 to move accordingly. After the second connecting rod 31 is moved, the second clamping block 34 is linked between the first movement groove 30 of the first clamping block 29 and the movement groove of the second clamping block 34 to drive the first clamping block 29 to rotate through the connecting shaft 35 adjacent to the clamping head 28, so that the clamping head 28 releases the second mold. In this way, the second mold can be released and placed on the cutting table 26 or on one side of the first mold 1 for the molding operation, which greatly reduces the labor of manually repeatedly moving or taking the workpiece by workers, avoids the deformation of the workpiece in the process of holding by hand, and greatly improves the quality and production efficiency in the preparation process of the thermally conductive sheet.

The housing can also be directly connected to a motor housing to be integrally formed with the motor, so as to wrap and protect the third connecting rod, the connecting table, the first clamping block, the second clamping block and the second connecting rod, which facilitates the linkage between the third connecting rod, the connecting table, the first clamping block, the second clamping block and the second connecting rod to clamp the second mold. In this way, the second mold can be flipped, and then the workpiece in the second mold groove of the second mold is flipped upside down on the cutting plate, and the cutting table is easy to perform orientated cutting on the workpiece.

Figure 10:
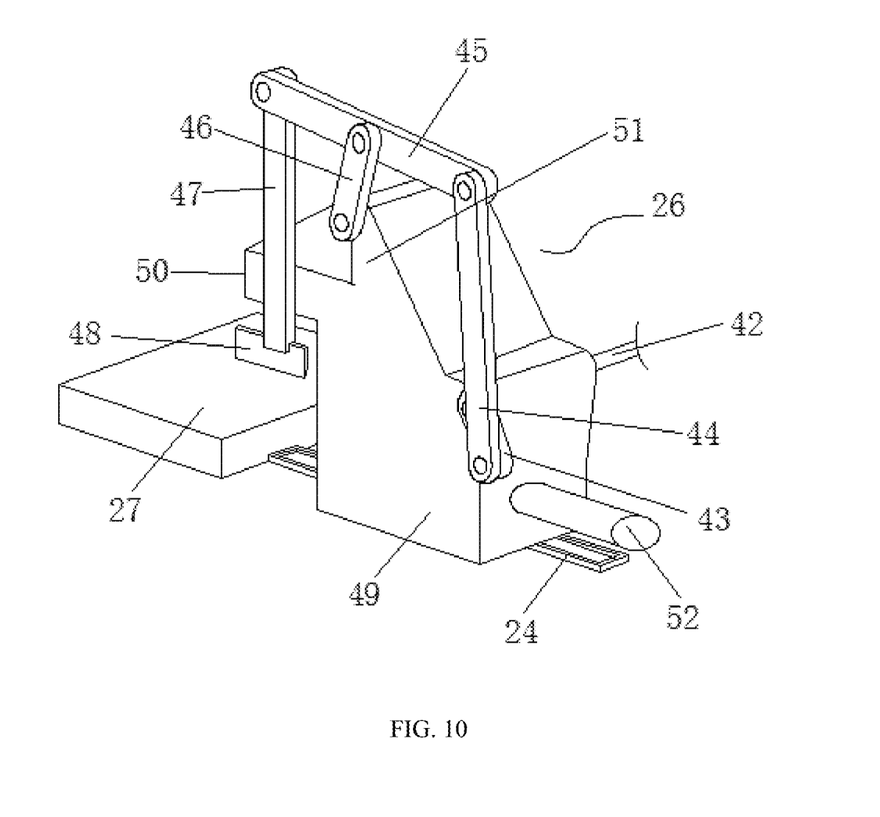
FIG. 10 is a schematic diagram of the structure of the cutting table according to the present invention.

As shown in FIG. 5 and FIG. 10, the cutting table 26 includes the connecting rod assembly, the base 49 and the cutter head 48, and the lower surface of the base 49 is slidably arranged on the first slide rail 24.

One end of the first slide rail 24 is connected to the cutting plate 27. The ninth connecting rod 52 is arranged on a side of the base 49 away from the cutting plate 27, and the ninth connecting rod 52 is configured to connect the driving device of the cutting table 26.

The third rotating shaft 42 penetrates the base 49 and is rotatably arranged at one end of the base 49 adjacent to the ninth connecting rod 52. One end of the third rotating shaft 42 is connected to the motor, and the other end of the third rotating shaft 42 is connected to one end of the fourth connecting rod 43. The other end of the fourth connecting rod 43 is rotatably connected to one end of the fifth connecting rod 44.

The other end of the fifth connecting rod 44 is rotatably connected to one end of the sixth connecting rod 45, and the other end of the sixth connecting rod 45 is connected to the eighth connecting rod 47.

The top of a side of the base 49 adjacent to the cutting plate 27 extends outward and is provided with the cutter head limiting table 50. The top of the base 49 is provided with the connecting rod limiting table 51.

The connecting rod limiting table 51 is a triangular structure. The seventh connecting rod 46 is rotatably arranged at the outside of an end of the triangular structure away from the base 49. The other end of the seventh connecting rod 46 is rotatably connected to the center of the sixth connecting rod 45.

The thermally conductive sheet prepared by the present invention is formed by repeatedly performing compression molding through the first mold 1 or the second mold and repeatedly performing cutting to finally improve the thermally conductive efficiency. Thus, it is very cumbersome to manually repeatedly mold and cut the workpiece. By using the clamping device to clamp the second mold, using the flipping device to displace and flip the second mold to the cutting table 26, and then using the cutting table 26 to cut the workpiece, the tedious manual reciprocating operation of the workpiece is eliminated.

During the specific working process, a sensor is arranged on the cutting table 26. When the sensor senses that the flipping device and the clamping device put the workpiece on the cutting table 26, the sensor transmits the signal to a controller. The controller activates the driving motor connected to the ninth connecting rod 52 to push the base 49 to approach the cutting plate 27 through the first slide rail 24. After the base 49 approaches the cutting plate 27, the driving motor is stopped, and the motor connected to the third rotating shaft 42 is started. In operation, the motor drives the third rotating shaft 42 to rotate. After the third rotating shaft 42 rotates on the base 49, the fourth connecting rod 43 fixedly connected to one end of the third rotating shaft 42 away from the motor is driven to rotate to drive the fifth connecting rod 44 movably connected to the fourth connecting rod 43 to move accordingly. The fifth connecting rod 44 moves to drive the sixth connecting rod 45 movably connected to the fifth connecting rod 44 to move. The sixth connecting rod 45 moves to drive the eighth connecting rod 47 fixedly connected to the sixth connecting rod 45 to move up and down. At the same time, in order to prevent the cutter head 48 from moving randomly when the eighth connecting rod 47 moves up and down, the connecting rod limiting table 51 is arranged on the top of the base 49. A rotating shaft is fixed on the connecting rod limiting table 51, and the rotating shaft is rotatably connected to one end of the seventh connecting rod 46. The other end of the seventh connecting rod 46 is rotatably connected to the center of the sixth connecting rod 45. In this way, the purpose of limiting the position of the sixth connecting rod 45 is realized, and the eighth connecting rod 47 can smoothly drive the cutter head 48 to cut the workpiece on the cutting plate 27. The cutter head limiting table 50 can facilitate reducing the displacement offset of the cutter head 48, thereby greatly improving the accuracy of cutting the workpiece on the cutting plate 27 using the cutting table 26.

Figure 12:
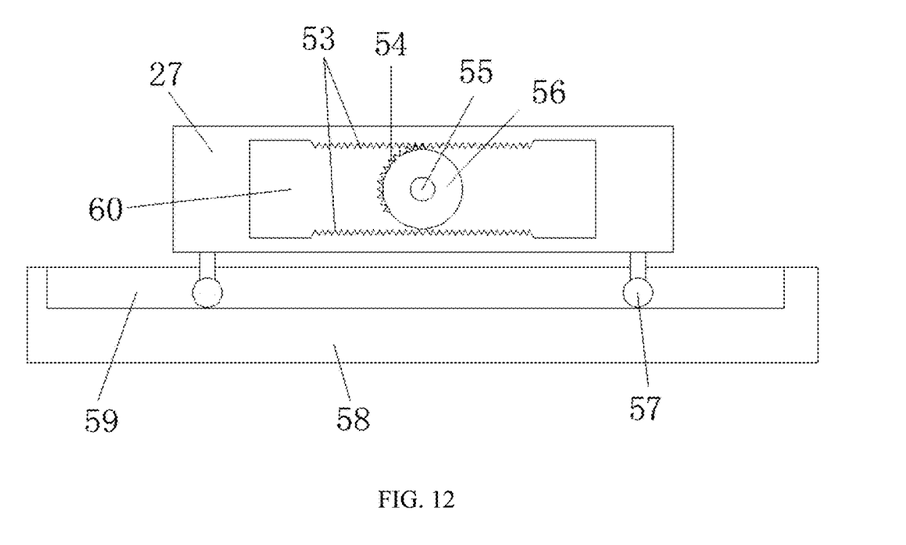
FIG. 12 is a schematic diagram of the structure of the backing plate according to the present invention.

As shown in FIG. 12, the backing plate 58 is arranged under the cutting plate 27, and the second slide rail 59 is arranged on the upper surface of the backing plate 58.

The rollers 57 are arranged at intervals at the lower surface of the cutting plate 27, and the rollers 57 reciprocate in the second slide rail 59.

The movement cavity 60 penetrates the center of the cutting plate 27. The rack plate 53 is arranged on the upper surface and the lower surface of the movement cavity 60, respectively. The ninth connecting rod 52 is configured as a threaded rod, and the base 49 is provided with a threaded hole adapted to the thread of the ninth connecting rod 52.

The end of the ninth connecting rod 52 away from the driving motor is rotatably connected to the fourth rotating shaft 55. The end of the fourth rotating shaft 55 away from the ninth connecting rod 52 is fixed to the rotating disc 56. The rotating disc 56 is provided with the meshing teeth 54, and the meshing teeth 54 are arranged at intervals on the circumferential outer wall of the rotating disc 56.

The distribution angle of the meshing teeth 54 on the circumferential outer wall of the rotating disc 56 is 100°-135°.

During the working process, the fourth rotating shaft 55 can be driven by the motor of the ninth connecting rod 52, or the fourth rotating shaft 55 is driven by a motor separately connected to the fourth rotating shaft 55. When a motor is separately configured for driving the fourth rotating shaft 55, the rotor end of the motor is connected to the fourth rotating shaft 55, and when the motor drives the rotor end, the fourth rotating shaft is driven to rotate. In this way, the meshing teeth of the rotating disc are meshed with the rack plates arranged on the upper wall and the lower wall of the movement cavity to enable the cutting plate to reciprocate above the backing plate. The speed of the motor can be set according to the cutting distance, and the specifications of the rack plate and the meshing teeth of the rotating disc can be set according to the cutting distance.

When the fourth rotating shaft 55 is driven by the driving motor of the ninth connecting rod 52, the ninth connecting rod 52 is a retractable connecting rod. The multi-connecting rod structure used for connecting the ninth connecting rod 52 is also provided with a slider and a slide groove, avoiding that the ninth connecting rod 52 fails to drive the rotating disc 56 when working due to the mutual driving between the various connecting rods. When the driving motor rotates clockwise, the driving motor drives the ninth connecting rod 52 to rotate. After the ninth connecting rod 52 rotates, the ninth connecting rod 52 drives the rotating disc 56 to rotate. After the rotating disc 56 rotates, the meshing teeth 54 on the circumferential outer wall of the rotating disc 56 rotates accordingly with the rotating disc 56. When the meshing teeth 54 rotates to the top of the rotating disc 56 and are meshed with the rack plate 53 on the upper side of the movement cavity 60, the cutting plate 27 is driven to move to the left. When the meshing teeth 54 rotates to the bottom of the rotating disc 56 and are meshed with the rack plate 53 on the lower side of the movement cavity 60, the cutting plate 27 is driven to move to the right. In this way, the cutting plate 27 can move back and forth above the backing plate 58. The roller 57 on the cutting plate 27 moves on the second slide rail 59 above the backing plate 58 along with the change in the movement of the rack plate 53 and the meshing teeth 54 on the rotating disc 56, which greatly improves the work efficiency of repeatedly cutting the thermally conductive sheet in the manufacturing process. Additionally, the inconsistency of cutting accuracy caused by manual operation of workers is further reduced, thereby greatly improving the production quality and efficiency of the thermally conductive sheet.

A groove configured for the clamping assembly to perform the clamping operation is arranged at both sides of the second mold. The clamping assembly is engaged in the groove to firmly clamp the second mold, thereby preventing the second mold from being detached from the clamping assembly in the process of flipping displacement.

The flipping driving device 14, the clamping driving device 18, the motor, the driving motor and the sensor are all connected to a controller. The controller is configured to control and drive the flipping driving device 14, the clamping driving device 18, the motor and the driving motor to work.

The sensor is an infrared sensor, and the infrared sensor includes a receiving end and a transmitting end.

A plurality of receiving ends are arranged on the cutter head limiting table 50, and a plurality of corresponding transmitting ends are arranged on the cutting plate 27. The receiving ends are connected to the controller, and transmit the signals from the transmitting ends received by the receiving ends to the controller, to enable the controller to drive the flipping driving device 14, the clamping driving device 18, the motor and the driving motor.

Figure 11:
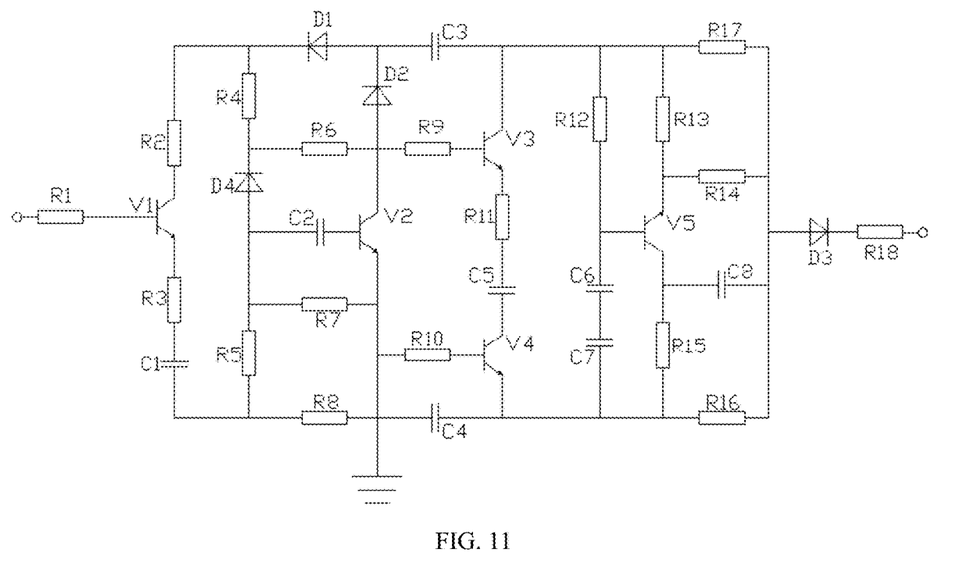
FIG. 11 is a schematic diagram of the control circuit according to the present invention.

As shown in FIG. 11, the controller includes a control circuit and a control chip. The control chip is connected to the control circuit. As shown in FIG. 11, the control circuit includes resistors R1, R2, R3, R4, R5, R6, R7, R8, R9, R10, R11, R12, R13, R14, R15, R16, R17, R18, capacitors C1, C2, C3, C4, C5, C6, C7, C8, triodes V1, V2, V3, V4, V5, and diodes D1, D2, D3, D4.

One end of the resistor R1 is the input end, and the other end of the resistor R1 is connected to the base of the triode V1. The collector of the triode V1 is connected to the resistor R2, and the emitter of the triode V1 is connected to the resistor R3.

The other end of the resistor R2 is connected to the resistor R4 and the cathode of the diode D1, and the other end of the resistor R3 is connected to the capacitor C1.

The other end of the resistor R4 is connected to the cathode of the diode D4, and the anode of the diode D4 is connected to the resistor R5. The capacitor C2 and the resistor R7 are separately connected in parallel between the resistor R5 and the anode of the diode D4.

The other end of the capacitor C2 is connected to the base of the triode V2. The collector of the triode V2 is connected to the anode of the diode D2, and the emitter of the triode V2 is connected in parallel with the resistor R7. The resistor R6 and the resistor R9 are separately connected in parallel between the anode of the diode D2 and the collector of the triode V2. The other end of the resistor R6 is connected in parallel between the resistor R4 and the cathode of the diode D4.

The other end of the resistor R9 is connected to the base of the triode V3, and the collector of the triode V3 is connected to the capacitor C3. The other end of the capacitor C3 is connected to the anode of the diode D1 and the cathode of the diode D2, respectively.

The other end of the resistor R5 is connected in parallel with the resistor R8, and the other end of the resistor R8 is connected to the capacitor C4. The emitter of the triode V2 is connected in parallel between the capacitor C4 and the resistor R8, and the emitter of the triode V2 is further separately connected in parallel with the resistor R7 and the resistor R10.

The other end of the resistor R10 is connected to the base of the triode V4. The collector of the triode V4 is connected to the capacitor C5. The other end of the capacitor C5 is connected to the resistor R11. The other end of the resistor R11 is connected to the emitter of the triode V3. The collector of the triode V3 is connected in parallel between the capacitor C3 and the resistor R17. The emitter of the triode V4 is connected in parallel between the capacitor C4 and the resistor R16.

The resistor R12 and the resistor R13 are also separately connected in parallel between the capacitor C3 and the resistor R17. The other end of the resistor R12 is connected to the capacitor C6, and the other end of the capacitor C6 is connected to the capacitor C7. The other end of the capacitor C7 is connected in parallel between the capacitor C4 and the resistor R16.

The resistor R15 is also connected in parallel between the capacitor C4 and the resistor R16. The other end of the resistor R15 is connected to the collector of the triode V5. The base of the triode V5 is connected in parallel between the capacitor C6 and the resistor R12, and the emitter of the triode V5 is connected to the resistor R13.

The resistor R14 is also connected between the emitter of the triode V5 and the resistor R13. The other end of the resistor R14, the resistor R17, the resistor R16 and the capacitor C8 are separately connected in parallel with the anode of the diode D3.

The other end of the capacitor C8 is connected in parallel between the resistor R15 and the collector of the triode V5. The cathode of the diode D3 is connected to the resistor R18, and the other end of the resistor R18 is the output end.

During the working process, a signal is first input through the resistor R1. After passing through the resistor R1, the electrical signal is amplified by the triode V1, filtered by a resistor-capacitor (RC) circuit and enters the triode V2. Then, the electrical signal is amplified by the triode V2 and divided into two paths to enter the triode V3 and the triode V4 for rectification, respectively. Finally, the electrical signal is output through the triode V5, and is output through the diode D3 and the resistor R8. The resulting signal can reduce signal distortion, improve the stability in the process of signal transmission, and reduce data packet loss caused by data signal distortion, thus improving the accuracy of data acquisition to further avoid the occurrence of abnormal control caused by inaccurate data.

Obviously, those skilled in the art can make various changes and modifications to the present invention without departing from the spirit and scope of the present invention. Therefore, if these changes and modifications of the present invention fall within the scope of the claims of the present invention and its equivalent technology, the present invention is also intended to include these changes and modifications.

What is claimed is:

1. A device for preparing a thermally conductive sheet with graphene fibers in an oriented arrangement, comprising a first mold, a second mold, an operating table, a flipping device and a cutting table; wherein, the first mold is configured to press a first cuboid block, and the second mold is configured to repeatedly press the first cuboid block pressed by the first mold;

the first mold, the second mold, the flipping device and the cutting table are arranged on an upper surface of the operating table; the operating table is a flat-plate structure, and supporting legs are arranged under the operating table;

the flipping device is arranged on one side of the first mold and the second mold; the cutting table is arranged on one side of the flipping device; the cutting table is provided with a cutting plate, and the cutting plate is arranged adjacent to the second mold;

the flipping device is configured to flip the second mold upside down on the cutting plate, and the cutting table is configured to cut the first cuboid block on the cutting plate;

the flipping device comprises a flipping driving device, a sprocket, a first rotating shaft and a flipping plate; wherein the flipping driving device is fixed above the operating table through a fixed rod standing on the upper surface of the operating table; a retractable end of the flipping driving device is connected to a first end of a first connecting rod, and a second end of the first connecting rod is connected to a chain; an end of the chain is fixed to one of gears in a circumferential direction of the sprocket, and the end of the chain is away from the first connecting rod;

an axial center of the sprocket is connected to the first rotating shaft, and two ends of the first rotating shaft are fixed above the operating table through a fixed plate standing on the operating table; the fixed plate is provided with a through hole, and the first rotating shaft rotates in the through hole;

an end of the first rotating shaft is provided with an extension portion, and the end of the first rotating shaft is adjacent to the second mold; an end of the extension portion is connected to the flipping plate, and the end of the extension portion is away from the fixed plate; a spring is sleeved on the extension portion; a first end of the spring is fixed on an outer side of the fixed plate, and a second end of the spring is fixed on the flipping plate; and an end of the flipping plate is connected to a clamping driving device, and the end of the flipping plate is away from the spring; a retractable end of the clamping driving device is connected to a mold clamp; and the mold clamp is configured to clamp or release the second mold.

2. The device according to claim 1, wherein, the first mold is provided with a first mold groove; a first mold cover covers an opening end of the first mold groove, and the first mold cover and the first mold are configured to press the first cuboid block.

3. The device according to claim 1, wherein, a second mold groove is arranged on one side of the second mold, and a second mold cover is arranged at an opening end of the second mold groove; and a movable thickness limiting block is arranged at a side of the second mold cover, and the side of the second mold cover is adjacent to the second mold groove; and the movable thickness limiting block is configured to be clamped in the second mold groove.

4. The device according to claim 1, wherein, the first cuboid block is made of a high-thermal conductivity mixture, and the high-thermal conductivity mixture comprises a mixture of matrix resin, carbon fiber and thermally conductive powder.

5. The device according to claim 3, wherein, the second mold groove comprises a concave portion and a convex portion, and openings are provided on both sides of the second mold groove; the movable thickness limiting block is placed at the openings on the both sides of the second mold groove; and a width of the second mold groove of the second mold is identical to a width of the first mold.

6. The device according to claim 1, wherein, the mold clamp comprises a third connecting rod, a connecting table and a clamping assembly; the connecting table is configured to connect the clamping assembly and the third connecting rod; an end of the third connecting rod is connected to the clamping driving device, and the end of the third connecting rod is away from the connecting table;

the clamping assembly is symmetrically arranged on both sides of the connecting table and the clamping assembly is configured to clamp or release the second mold;

a housing is arranged outside the clamping assembly and the connecting table, and the housing is configured to install the clamping assembly and the connecting table as a whole;

the clamping assembly comprises a first clamping block, a second clamping block and a second connecting rod; a clamping head is arranged at a first end of the first clamping block, and a first movement groove is arranged at a second end of the first clamping block; a second movement groove is arranged at a first end of the second clamping block, and a second end of the second clamping block is movably connected to the connecting table;

the second connecting rod is arranged in the first movement groove and the second movement groove, and the second connecting rod is rotatably connected in the first movement groove and the second movement groove by a connecting shaft;

two connecting shafts are arranged on each of the first clamping block and the second clamping block, and the two connecting shafts are fixed on an inner wall of the housing;

wherein, a first connecting shaft of the two connecting shafts is configured for the second connecting rod to move in the first movement groove and the second movement groove, and a second connecting shaft of the two connecting shafts is configured for the first clamping block and the second clamping block to rotate around the connecting shaft; the second connecting shaft is arranged adjacent to the connecting table; and a connecting pipe is arranged at an end of the second clamping block, and the end of the second clamping block is away from the second connecting rod; a second rotating shaft is arranged in the connecting table; the connecting pipe is rotatably sleeved on a circumferential outer wall of the second rotating shaft; a third movement groove is arranged inside the connecting table, and the third movement groove is configured for the second clamping block to rotate on the both sides of the connecting table.

7. The device according to claim 1, wherein, the cutting table comprises a connecting rod assembly, a base and a cutter head, and a lower surface of the base is slidably arranged on a first slide rail;

one end of the first slide rail is connected to the cutting plate; a ninth connecting rod is arranged on a side of the base, and the side of the base is away from the cutting plate, and the ninth connecting rod is configured to connect a driving device of the cutting table;

a third rotating shaft penetrates the base and the third rotating shaft is rotatably arranged at an end of the base, and the end of base is adjacent to the ninth connecting rod; a first end of the third rotating shaft is connected to a motor, a second end of the third rotating shaft is connected to a first end of a fourth connecting rod, and a second end of the fourth connecting rod is rotatably connected to a first end of a fifth connecting rod;

a second end of the fifth connecting rod is rotatably connected to a first end of a sixth connecting rod, and a second end of the sixth connecting rod is connected to an eighth connecting rod;

a top of a side of the base extends outward and is provided with a cutter head limiting table, and the side of the base is adjacent to the cutting plate; a top of the base is provided with a connecting rod limiting table; and the connecting rod limiting table is a triangular structure; a first end of a seventh connecting rod is rotatably arranged at an outside of an end of the triangular structure, and the end of the triangular structure is away from the base; and a second end of the seventh connecting rod is rotatably connected to a center of the sixth connecting rod.

8. The device according to claim 7, wherein, a backing plate is arranged under the cutting plate, and a second slide rail is arranged on an upper surface of the backing plate;

rollers are arranged at intervals on a lower surface of the cutting plate, and the rollers reciprocate in the second slide rail;

a movement cavity penetrates a center of the cutting plate; a rack plate is arranged on an upper surface and a lower surface of the movement cavity, respectively; the ninth connecting rod is configured as a threaded rod, and the base is provided with a threaded hole; the threaded hole is adapted to a thread of the ninth connecting rod;

an end of the ninth connecting rod is rotatably connected to a fourth rotating shaft, and the end of the ninth connecting rod is away from a driving motor; an end of the fourth rotating shaft is fixed to a rotating disc, and the end of the fourth rotating shaft is away from the ninth connecting rod; the rotating disc is provided with meshing teeth, and the meshing teeth are arranged at intervals on a circumferential outer wall of the rotating disc; and a distribution angle of the meshing teeth on the circumferential outer wall of the rotating disc is 100°-135°.

* * * * *